June 23, 1959 R. W. TRIPP 2,891,437
FOLDED OPTICS RETICULE SYSTEM
Filed Oct. 31, 1956 3 Sheets-Sheet 1

INVENTOR.
R. W. TRIPP
BY Wade Koontz
Charles & Wagner
ATTORNEYS

INVENTOR.
R. W TRIPP
BY
ATTORNEYS

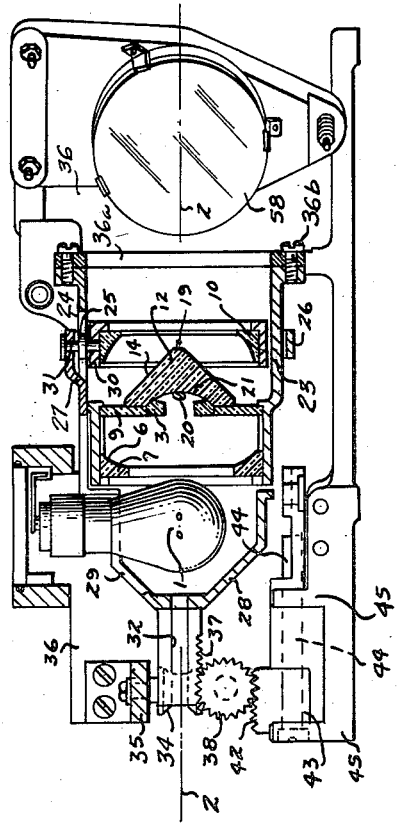

United States Patent Office 2,891,437
Patented June 23, 1959

2,891,437

FOLDED OPTICS RETICULE SYSTEM

Robert W. Tripp, Bronxville, N.Y., assignor to the United States of America as represented by the Secretary of the Air Force Application October 31, 1956, Serial No. 619,655

5 Claims. (Cl. 88—1)

This invention relates to optical reticules of the illuminated type from which images of the illuminated reticule designs thereof are projected onto a sighting glass to provide sighting images and has for an object the provision of a novel and effective optical reticule of the folded optics type which provides adequate brilliancy throughout the entire field of the projected image of the reticule. It includes means for projecting a brilliant central dot image at the center of the reticule with a concentric brilliant thin ring of light surrounding the dot with means for varying the radius of the light ring image.

A further object is the utilization of a plurality of ring shaped full mirrors each having a concave reflecting surface and a centered positive lens means for simultaneously focusing the combined circle and central dot to a fixed image plane.

A further object of the invention is the provision of a conical shaped full mirror mounted concentrically within the second one of the ring shaped concave full mirrors for changing the reflected direction of a ring of converging light rays reflected from a first ring shaped conical reflector toward the central axis of the second ring shaped reflector in a direction parallel to said axis for reflecting a converging ring of light rays to the image plane.

A further object includes a transparent aperture in the tip of the conical reflector substantially in a focal or image plane and a central positive lens means disposed concentrically in the base of the conical reflector for focusing light rays from the source of concentrated illumination through said conical reflector and said tip to said image plane.

A further object is the provision of a folded optics reticule system for sights including a first and a second axially spaced ring shaped full mirror each having parabolic reflecting surfaces facing toward each other and toward the central axis of the rings in which said first full mirror receives light from a light source and reflects the light in a concentric collimated ring to the reflecting surface of the second ring shaped full mirror and the second mirror reflects and concentrates the collimated ring of light radially inwardly to a plane passing through the second ring reflector perpendicular to the axis and also includes a fixed transparent support in the collimated ring of light between the first and second ring shaped mirrors with a central positive lens mounted concentrically for concentrating light from the light source to a spot in an image plane perpendicular to the axis and located at the side of the second ring shaped mirror remote from the parabolic reflecting surface thereof, together with a conical full mirror having a slope of 45° with its base supported on said transparent support and an exterior conical full mirror surface in the path of the ring of converging light reflected by said second ring shaped reflector for reflecting the ring of converging light rays from said second ring shaped reflector to the image plane in concentric surrounding relation to said illuminated spot, in which the tip of said conical reflector is transparent and flat to pass the concentrated rays from said positive lens means through said conical reflector to the image plane.

A further object includes means for mounting the second ring shaped full mirror for axial adjustment to vary the diameter of the concentric ring of light in said image plane.

A further object includes a reticule system as indicated above with provisions for shifting the second ring shaped full mirror axially toward and away from the first ring shaped full mirror for varying the radius of the illuminated ring in said image plane.

Other objects and advantages of the invention will become apparent from the following description and accompanying drawings in which like reference characters refer to like parts in the several figures.

*Drawings*

Figure 7 is a transverse sectional view taken about on the plane indicated by line 7—7 of Figure 5, parts being shown in elevation.

Figure 1:
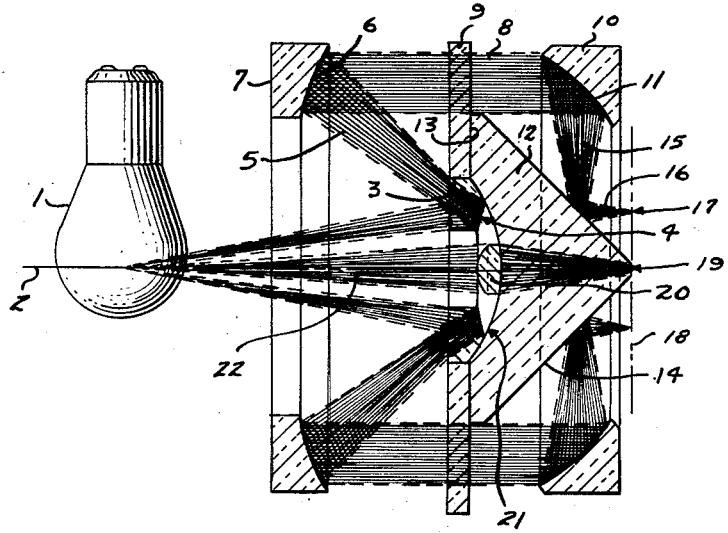
Figure 1 is a schematic longitudinal sectional view through a folded optics reticule system constructed according to the invention, the source of illumination being shown in elevation and dot and dash lines indicating the light path from the light source through the reticule system to the image plane.

Referring more particularly to Figure 1 the reference numeral 1 denotes a source of concentrated illumination such as an electric concentrated filament bulb and reference numeral 2 is the central axis through the reticule system. Concentrically surrounding the central axis 2 in a plane, perpendicular thereto, is a ring shaped prism 3 having a convex full mirror reflecting surface 4 for receiving light from said light source 1 and reflecting the same rearwardly and outwardly as indicated at 5 in an expanding ring shaped beam, onto a first parabolic full mirror reflecting surface 6 of a ring shaped concentric reflector 7, having its focal point at the center of the light source 1. The concave reflecting surface 6 of this first ring shaped reflector 7 receives the expanding ring shaped light beam 5 from the convex mirror surface 4 and reflects the same away from the mirror 7 and light source 1 in a collimated ring or sleeve of light 8 surrounding the central axis 2 and the smaller ring shaped prism mirror 4 in concentric relation thereto. The convex full mirror surface 4 is on the back of the annular ring prism 3 and is fixed within the collimated ring shaped light beam 8 on a transparent support 9 in the form of a glass plate.

A second ring shaped reflector 10 is disposed in axially spaced relation to the first reflector 7, with the transparent support 9 interposed therebetween in the annular beam of collimated light rays 8 and has a parabolic full mirror surface 11 in the collimated light beam 8 with its focal point in a plane through the center of the reflector 10 perpendicular to the central axis 2 for reflecting and contracting the collimated ring of light 8 radially inward toward said central axis 2 and its focal point.

A conical prism or transparent glass cone 12 is mounted on said supporting plate 9 concentric to the central axis 2 with its base 13 facing said light source 1 and the supporting plate 9, with an outer full mirror reflecting surface disposed at a slope of 45° to the central axis. The outer full mirror surface 14 of said conical reflector 12, from the base to substantially its apex or tip is "silvered" and polished to provide a front surface cone shaped full mirror reflecting surface 14 disposed within and extending through said second ring shaped reflector 10 to receive the contracting ring of light rays 15 from the mirror surface 11 of the ring mirror 10 and reflect the same at 90° in a contracting ring of light 16, with its focal point at 17 in the image plane 18, perpendicular to the central axis 2.

The extreme tip of the conical transparent prism 12 is flattened perpendicularly to the central axis 2 as indicated at 19 and left unsilvered or transparent and disposed substantially in the image plane 18.

A positive lens means 20 is fixed in the center of a concave recess 21 in the base of the conical reflector 12, the lens means 20 receiving direct light rays 22 from the light source 1 and converging said light through said conical prism and reflector 12 onto said flattened tip 19 in said image plane for illumination thereof to form a concentrated light image in the form of an illuminated spot or dot.

The ring shaped full mirror surfaces 4 and 6 and the conical full mirror 12 are all disposed in fixed axial and concentric relation to each other and to the light source 1 and the image plane 18. The second large ring shaped full mirror 10, however, is axially adjustable on the central axis 2, to vary the diameter of the ring of light image reflected therefrom in the image plane 18.

Figures 2, 3, 4:
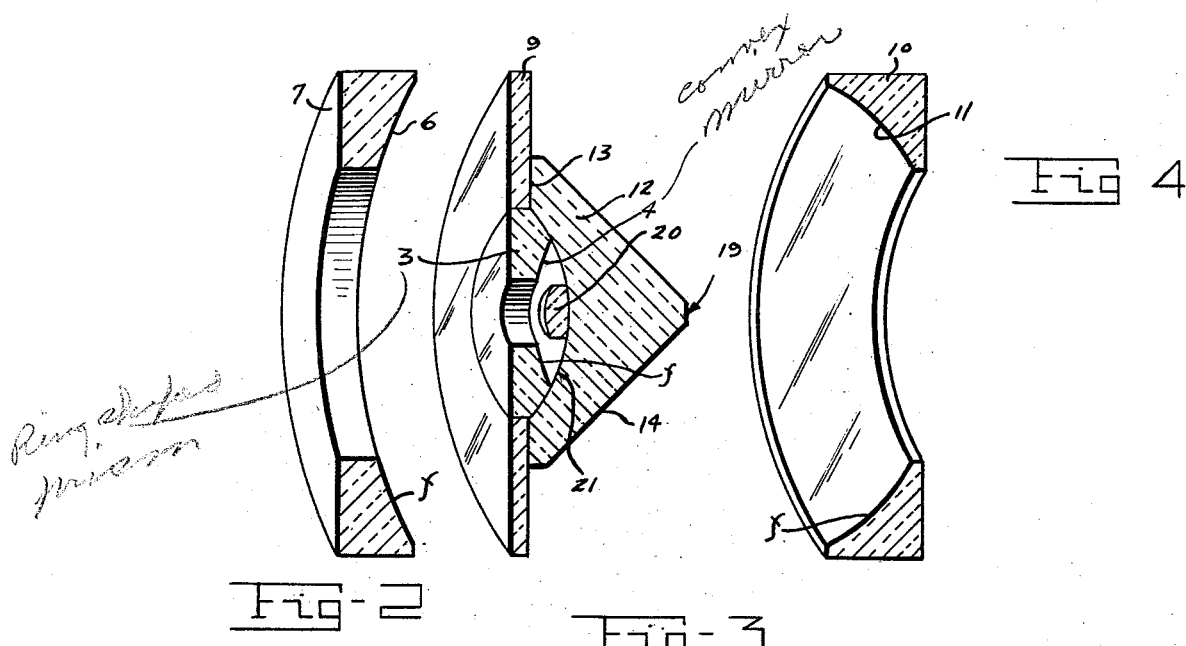
Figures 2, 3 and 4 are transverse sectional views in perspective illustrating the optical elements of the reticule system.

Reference being made to Figures 2, 3 and 4, the individual optics are illustrated in half section perspective and on the specification for the curvatures of the front and rear surfaces of the various elements of the assembly are tabulated below in millimeters.

[Table in millimeters.]

| Element | Glass | $R_1$ | $R_2$ | $R_3$ | Thickness | F.A. | Diameter |
|---|---|---|---|---|---|---|---|
| 7 | Plate | ∞ | 51.25 | | 2.0 | 30–46 | 48 |
| 20 | C-1 | 3.82 | −16.0 | | 1.7 | 4.0 | 5 |
| 3 | C-1 | −440.9 | 28.12 | 16.0 | 3.0 | 7.66–16.6 | 20 |
| 9 | Plate | ∞ | ∞ | | 2.0 | 30–46 | 48 |
| 12 | C-1 | −16.0 | 90° cone | | 13.3 | 30. | 30 |
| 10 | Plate | (*) | ∞ | | | 30–46 | 48 |

*$Y^2 = -38.0X$.

in which $R_1$ indicate the left hand surfaces of the lenses and plates as seen in Fig. 4, $R_2$ indicating the right hand surfaces, and $R_3$ the right hand inner or central surface. FA indicates the full aperture diameter of the lens, $Y^2$ the only curved reflection surface ($R_1$) of the lens element 10 which has a "FA" ring with outside diameter of 46 and inside diameter of 30 (same as plate 7). OX indicates outside reflecting surface 11, both surfaces 6 and 11 are outside surface mirrors, measurements being in millimeters.

Figure 5:
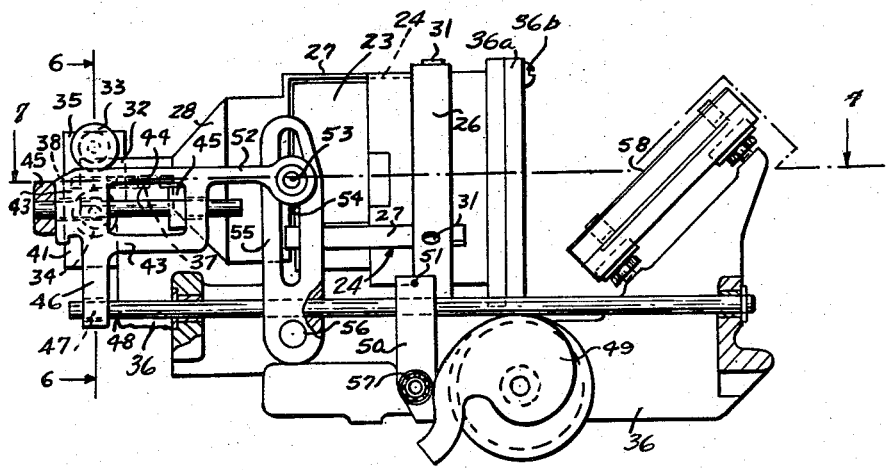
Figure 5 is an elevation showing the improved reticule system incorporated in a reticule mounting with means for shifting the second ring shaped mirror relative to the first ring shaped mirror to vary the diameter of the reflected light ring in the image plane to compensate for apparent changes in the wing span of a target due to variations in "range," parts being broken away and shown in section.
Figure 6:
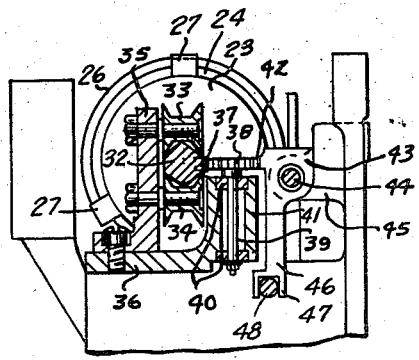
Figure 6 is a vertical sectional view taken approximately on the plane indicated by line 6—6 in Figure 5.

Referring now to Figures 5, 6 and 7 the reference numeral 23 denotes a fixed support or casing in which the first mirror 7 and the supporting plate 9 carrying ring prism mirror 3, the conical mirror 12 and the positive lens 20 are fixed. The casing 23 is supported from the main support frame structure 36 by a ring 36ᵃ and fastenings 36ᵇ and has a plurality of guide slots 24 in which guide bearings 25 are located. The guide bearings are carried by an annular ring or band 26 having axially extending actuator rods or bars 27, which extend rearwardly to join the lamp housing 28. The housing 28 has a slotted opening 29 to secure the lamp or source of illumination and permit axial movement of the lamp housing. The second mirror 10 is fixed in an annular supporting frame or sleeve 30 which is, in turn, fixed to and supported on the rods or trunnions 31, which trunnions extend through the guide bearings 25 and are fixed in the ends of the actuator bars or rods 27 for axial adjustment toward and away from the ring mirror 7 with respect to the lamp housing 28.

The forward end of the lamp housing 28 is formed with a forwardly projecting, axial or central, extension or guide stem actuator 32 which is retained guidingly for axial adjustment by the top and bottom guide rollers 33 and 34 mounted on a bracket 35 which is fixed on the supporting structure 36 which carries the fixed supporting sleeve or casing 23.

The axial adjustment of the second ring shaped second mirror 10 is accomplished by axial adjustment of the lamp housing 28. The axial extension 32 of the lamp housing 28 is provided with a rack 37 which meshes with a gear 38 fixed on a shaft 39 which is journalled in suitable bearing 40 on a sleeve bracket 41 formed on the housing 36.

The gear 38 meshes at its opposite side with a second rack member 42 formed on a guide block 43 which is slidable on a guide rod 44 fixed in brackets 45 forming part of the supporting frame work 36 (see Fig. 6).

The guide block 43 is formed with a downwardly projecting arm 46 best seen in Figure 6 with a bifurcated end 47 straddling an actuator rod 48 slidably journalled in the main support frame structure 36.

The rod 48 is adjustable axially by a cam member 49 (see Figure 5) which impinges on actuator arm 50 clamped on the rod 48 by a clamp screw 51.

The guide block or frame 43 has a shifter arm extension 52 with a lateral projection at 53 disposed in a slot 54 in a link or arm 55 which is secured to the rod 48 by clamp fastener member 56. Means are provided (not shown) for maintaining the lateral extension or roller member 57 on the arm 50 in contact with its cam 49.

Rotative adjustment of the cam 49 therefore axially adjusts the actuator rod 48, shifting the position of the link arm 55 which in turn shifts the frame 43 on the guide rod 44. The rack 42 on the frame 43 rotates the motion transfer gear 38 which meshes with the rack 37 on the stem 32, shifts the stem and lamp housing 28 in the opposite direction to movement of the rod 48. The housing 28 through the rods or arms 27 correspondingly adjusts the outer ring 26 which, through the connection to the inner ring or mounting 30 for the second mirror 10 axially adjusts the second mirror 10 relative to the conical reflector 12. This correspondingly increases or decreases the diameter of the ring of light reflected from the full mirror surface 14 of the cone 12.

With the parts shown in Figures 5 and 7 the diameter of the reticule ring is the smallest and as the actuator rod 48 is adjusted forwardly or in a direction toward the right in these figures the second reflector ring 10 is correspondingly adjusted to the left increasing the diameter of the reticule light ring.

A conventional front surface mirror 58 is fixed on the supporting structure 36 at an angle of 45° to the central axis for reflecting the reticule image from the image plane 18 at substantially 90° to the central axis 2, as is conventional sights. The image from the mirror 58 is reflected onto an inclined sighting glass (not shown) usually located in front of the eyes of the person using the sight, such as the inclined wind shield of a military aircraft. Adjustment of the size of the reticule ring is used to span a target aircraft and means are employed forming no part of this invention and therefore not specifically shown for adjusting the position of this second ring mirror 10 to correspond to different size and types of aircraft according to the range and means for indicating or determining the range accordingly.

While I have described my invention and illustrated the same for exemplary purposes I do not wish to be limited to the precise details shown and described as changes may be readily made therein without departing from the spirit of my invention as defined in the accompanying claims.

I claim:

1. In a folded optics reticule system for sights, a source of concentrated illumination, a first fixed ring shaped full mirror adjacent said source of illumination having a central axis passing through the center of said source of illumination, said first mirror having an annular concave reflecting surface with its axis coincident with said central axis, and facing away from said source of illumination, a transparent support fixed relative to said first mirror in a plane across said central axis perpendicular thereto, in axially spaced relation from said source of illumination beyond said first mirror, a smaller ring shaped full mirror disposed concentrically to said central axis on said support, said smaller mirror having an annular convex reflecting surface surrounding said central axis and facing toward said source of illumination for reflecting and diverging rays of light received thereon from said source of illumination rearwardly and outwardly in the form of a circular ring of light on said first mirror reflecting surface, said first full mirror having a parabolic curvature with its focal point on said central axis for receiving and reflecting the ring of light rays received from said smaller convex ring mirror through said transparent support in a collimated ring of light parallel to said central axis, a second ring shaped parabolic full mirror disposed in the ring of collimated light from said first mirror and facing said first mirror with its focal point on said central axis in a plane through the reflecting surface of the second mirror perpendicular to said central axis, for reflecting converging said ring of collimated light radially inward to a common focal plane through said central axis perpendicular thereto, a concentric conical full mirror fixed on said transparent support and projecting through the center of the ring shaped parabolic reflector of the second mirror in the path of the ring of light from the said second ring shape mirror for reflecting the ring of light rays therefrom in a direction parallel to said central axis, said folded optics having an image plane adjacent the apex of said conical reflector perpendicular to said central axis, positive lens means fixed on said support in the base of said conical reflector for receiving direct light rays from said source of illumination and concentrating such rays substantially in said image plane at the apex of said conical reflector, said conical reflector having a transparent conical body having a slope of substantially 45° terminating in a small flat transparent tip extremity at its apex substantially in said image plane, substantially at the focal point of said positive lens means with the balance of the exterior of said conical body from the base to said apex opaqued to prevent the passage of light therethrough to provide a light image spot in said image plane on said central axis surrounded by a circular, concentric thin ring of light surrounding said spot, said second reflector being movable axially on said central axis for varying the diameter of said reflector through ring of light in said image plane.

2. In a folded optics reticule system having central sight axis, a source of concentrated illumination on said axis, a full mirror having a spherical convex reflecting surface facing said source of illumination with its center on said axis spaced axially in a plane behind said reflecting surface and formed with a concentric light passing opening therethrough, for reflecting a diverging ring of light from said source of illumination outwardly and rearwardly toward said source of illumination, a first concentric ring shaped full mirror reflecting surface disposed in a plane perpendicular to said axis and located between said light source and said convex reflecting surface to receive said ring shaped diverging light beam, said first full mirror reflecting surface having a parabolic curvature with its focal point on said axis and located rearwardly of said first mentioned full mirror reflecting surface for reflecting and collimating the outwardly diverging ring of light in parallel surrounding relation to said axis in a direction away from said light source, a transparent supporting plate disposed perpendicularly across said axis for supporting said first mentioned spherical mirror convex reflecting surface in fixed relation to said first ring shaped full mirror reflecting surface, a conical reflector fixed on said supporting plate with its apex and the center of its base on said axis with its apex extending away from said source of illumination, said conical reflector having a full mirror outer reflecting surface disposed at a substantially 45° slope to the said axis, said conical reflector having a flat transparent tip, located in an image plane and having a predetermined area equal in size to a central reticule image dot, positive lens means fixed in concentric relation to said conical reflector, intermediate said source of illumination and said image plane for concentrating light from said source of illumination to said transparent tip of said conical reflector, a second ring shaped mirror disposed in concentric relation to said axis in the collimated ring of light rays from said ring shaped mirror, said second ring shaped mirror being movable axially toward and away from said transparent supporting plate in concentric surrounding relation to said conical reflector, said second ring shaped mirror having a parabolic ring shaped full reflecting surface facing toward the conical reflecting surface of the conical reflector and the parabolic reflecting surface of said first mirror for reflecting said collimated beam of light from said first ring shaped full mirror toward said conical reflecting surface in a plane perpendicular to said axis, whereby axial movement of said second ring-shaped mirror causes a shifting of the ring of light reflected by the conical mirror, in a variable diameter circular ring of light in said image plane, concentric to said axis and said illuminated dot.

3. In a folded optics, sight reticule system, a source of concentrated illumination, a first ring shaped full mirror adjacent said source of concentrated illumination having a central axis passing through the center of said source of concentrated illumination, said first ring shaped full mirror having an annular, concave reflecting surface facing away from said source of concentrated illumination with its axis coincident with said central axis, a transparent support fixed relative to said first mirror in a plane across said central axis perpendicular thereto in spaced relation to said first mirror, a smaller ring shaped full mirror having an annular convex reflecting surface surrounding said central axis and facing toward said source of concentrated illumination and said first mirror for receiving light rays from said source of concentrated illumination and reflecting the same rearwardly and outwardly to the reflecting surface of said first mirror, said first ring shaped mirror reflecting surface having a parabolic curvature with its focal point on said central axis, for reflecting the ring of light rays received from said smaller ring shaped full mirror through said transparent support in a collimated ring of light parallel to said central axis, a second axially adjustable ring shaped parabolic full mirror disposed in the path of said ring of collimated light and facing toward said first ring shaped full mirror with its focal point on said central axis in a plane through said second ring shaped parabolic mirror perpendicular to said central axis, for reflecting and concentrating said ring of collimated light rays radially inward toward a common focal point substantially on said central axis, a cone shaped full mirror projecting axially through said second ring shaped parabolic full mirror in the path of the reflected ring of converging light rays therefrom, fixed on said transparent support concentrically to said central axis with its apex facing away from said transparent supporting plate and the smaller ring shaped full mirror for reflecting the converging ring of light rays received from said second ring shaped parabolic full mirror in a direction parallel to said central axis to an image plane adjacent the apex of said cone shaped full mirror, said cone shaped full mirror having a flattened and transparent apex in a plane perpendicular to central axis substantially in said image plane to transmit a small shaft of light therethrough on said central axis to said image plane, to produce a light image spot in said image plane on said central axis, surrounded by an annular concentrated thin ring image of light, said second ring shaped full mirror being movable axially on said central axis relative to said cone shaped mirror to vary the radius of said thin concentrated ring of light in said image plane from said central spot of light.

4. A folded optics sight reticule system as disclosed in claim 3, in which said cone shaped full mirror has a slope of 45° and its exterior surface silvered to form a full mirror with the tip of the cone unsilvered to pass light through said tip.

5. A folded optics sight reticule system as disclosed in claim 4, in which said cone shaped full mirror comprises a transparent conical prism having its base disposed on said transparent support and formed with a concave surface concentric with said central axis and facing said source of illumination, and includes positive lens means located on said central axis and on said concave surface for receiving direct light rays from said source of illumination through the centers of said first and second ring shaped mirrors and concentrating said direct light rays through said conical prism onto the unsilvered tip of said conical prism.

References Cited in the file of this patent

UNITED STATES PATENTS

| | | |
|---|---|---|
| 1,988,946 | Hauser et al. | Jan. 22, 1935 |
| 2,198,014 | Ott | Apr. 23, 1940 |
| 2,393,832 | Steckbart | Jan. 29, 1946 |